United States Patent [19]

Körfgen et al.

[11] Patent Number: 5,014,736
[45] Date of Patent: May 14, 1991

[54] SHUT-OFF AND CONTROL VALVE

[75] Inventors: Harald Körfgen, Fröndenberg; Heinz Hirsch, Soest; Vinzenz Grendel, Hemer; Friedrich Wagner, Endingen; Walter Grau, Mahlberg, all of Fed. Rep. of Germany

[73] Assignee: Friedrich Grohe Armaturenfabrik GmbH & Co., Hemer, Fed. Rep. of Germany

[21] Appl. No.: 406,906

[22] Filed: Aug. 10, 1989

[30] Foreign Application Priority Data

Aug. 19, 1988 [DE] Fed. Rep. of Germany ....... 3828178

[51] Int. Cl.⁵ .................. F16K 43/00; F16K 5/18; F16K 47/14
[52] U.S. Cl. .................. 137/315; 137/454.5; 137/625.31; 251/180; 251/208; 251/304
[58] Field of Search .............. 137/454.2, 454.5, 454.6, 137/315, 625.31; 251/176, 180, 208, 304, 214

[56] References Cited

U.S. PATENT DOCUMENTS

| Re. 5,790 | 3/1874 | Stevens | 137/454.5 |
| 86,268 | 1/1869 | Baker | 251/180 |
| 130,876 | 8/1887 | Stevens | 137/454.5 |
| 1,176,253 | 3/1916 | Schutt | 251/180 |
| 2,510,356 | 6/1950 | Werts | 137/454.2 |
| 2,913,006 | 11/1959 | Heymann | 251/180 |
| 2,923,318 | 2/1960 | Monson | 137/454.6 |
| 3,807,455 | 4/1974 | Farrell | 251/180 |
| 3,834,416 | 9/1974 | Parkison | 137/454.2 |

FOREIGN PATENT DOCUMENTS 3107431 9/1982 Fed. Rep. of Germany .

Primary Examiner—George L. Walton
Attorney, Agent, or Firm—Herbert Dubno

[57] ABSTRACT

A shut-off valve mechanism for a shut-off and control valve has a generally cylindrical housing with inner and outer annular shoulder against which a valve seat disk is placed to prevent distortion of the valve seat disk. The valve control disk is pressed by spring forces against the valve seat disk from its upstream side and is entrained in rotation by a spindle passing through the inner annular shoulder and the valve seat disk.

12 Claims, 2 Drawing Sheets

SHUT-OFF AND CONTROL VALVE

FIELD OF THE INVENTION

Our present invention relates to a shut-off and control valve, especially for faucets and other sanitary fixtures and water valves. More particularly, the invention relates to a so-called cartridge-type valve having an axial inlet and a radial outlet and wherein the control elements are received in a housing insertable in the body of the valve.

BACKGROUND OF THE INVENTION

A control or shut-off valve, especially a water valve, can comprise a valve body formed with the radial inlet and outlet and a valve unit which can be insertable in this valve body.

The valve unit, which can be referred to as a cartridge because it contains the sealing elements and valve mechanism in a housing which can be replaced as a unit in the valve, can comprise a valve seat disk extending transversely to the longitudinal axis about which a valve spindle is rotatable in the housing, the valve seat disk having at least one throughgoing opening and being nonrotatably held in the housing. A valve control disk is rotatable in the housing for the valve spindle and lies upstream of the valve seat disk and the valve control disk may be stressed by a spring against the valve seat disk. The two valve disks extend across the inlet opening in the housing and between the supply passage of the valve and the housing, a sealing element can be provided. A valve of this type is described in German Open Application DE-OS 3107431.

The valve unit with its housing is so constructed, in this system, that it can also be used in already installed valves that originally may have had other types of standard valve mechanisms with axially shiftable closure parts.

In the valve system of this patent document, however, the valve seat disk is braced only against an outer annular shoulder of the housing so that a relatively thick plate must be used as the valve seat disk to prevent deformation and distortion under the water pressure and spring pressure which may be applied.

In spite of the thickness of the valve seat disk employed, however, it is not possible to guarantee, in this construction, that pressure shocks applied to the valve seat disk will not bend or deform the latter and thereby give rise to leakage and even rupture of the valve seat disk.

Another drawback of this earlier system is that the spring, required to maintain a minimum pressing force for holding the valve control disk against the valve seat disk, is located in the water flow region of the inlet opening which has proved to be a highly disadvantageous locale for such a spring.

U.S. Pat. No. 2,923,318 illustrates a shut-off and control valve in which valve units are receivable in specially shaped receiving bores of the valve body. The valve seat disk in inserted from the downstream side and is supported by a coaxially oriented tubular pin. In this construction as well, bending by pressure or shock forces of the valve seat disk cannot be precluded and it is also possible that the forces applied will generate a distorting stress on the valve seat disk. Another drawback of this latter system is that the valve must be assembled from a relatively large number of complex parts so that even the housing must be bypartite.

OBJECTS OF THE INVENTION

It is, therefore, the principal object of the present invention to provide an improved valve, especially a water shut-off and control valve, which is comparatively inexpensive, is composed of relatively few parts and which utilizes a valve mechanism or unit which can be inserted into a wide variety of valve bodies.

Another object of this invention is to provide an improved valve having a replaceable valve unit provided with the actuating and sealing members, which obviates the disadvantages of both of the prior art valves described above.

It is also an object of this invention to provide an improved valve utilizing a valve unit and in which the disadvantageous orientation of the spring is avoided and the valve seat disk need not be of a massive nature to prevent bending or distortion.

SUMMARY OF THE INVENTION

These objects and others which will become apparent herein after are attained, in accordance with the present invention, in a valve of the type previously described but wherein the housing of the valve unit within the outline of the inlet opening thereto, has at least one outer support shoulder in the region of the housing wall and an inner support shoulder in the region of a throughgoing opening for the valve spindle, the spring being operatively connected to the valve controlled disk via the valve spindle, so that the spring can be braced against the housing and the valve spindle to exert thrust upon the valve control disk in the direction of and against the valve seat disk which is pressed against both of the aforementioned shoulders. According to a feature of the invention, the spring is separated from the space traversed by the liquid. The valve spindle can have a head portion form-fittingly engaging the valve control disk so as to enable it to apply the axial thrust generated by the spring source, as well as rotation to the valve control disk.

The head of the spindle can thus have a polyhedron profile, e.g. a hexagonal profile, and can be received in a correspondingly shaped opening of the valve control disk. Behind this head portion of the valve step, a sealing ring can be provided for sealing the opening in the valve control disk. The spring is preferably a compression coil spring received in a recess in the housing downstream of the seal and separated from the spaces within the valve transversed by the liquid.

According to another feature of the invention the upstream end of the valve spindle can be provided with an entrainer providing a form-fitting connection between the valve spindle and the valve control disk.

Alternatively, the spring can be an axially compressible ring of an elastomer, e.g. rubber. This ring can be disposed between the entrainer and the valve control disk and can be tapered in the direction of its end faces with, for example, frustoconical configuration.

In the region of the inner and outer support shoulders, respective sealing rings which are concentric with the valv spindle can be provided to seal between the valve seat disk and the housing.

Downstream of the valve seat disk an annular space can be defined in the housing between the inner and outer support shoulders to communicate on the one hand with one or more radial outlets in the housing communicating with the valve outlet and, on the other hand, with one or more throughgoing openings in the valve seat disk.

According to another feature of the invention, the upstream end of the valve spindle can be provided with at least one entraining surface upon which the entrainer is axially shiftable but angularly fixed so that retention and the generation of a prestress of the spring can be effected by means of a nut threaded onto the spindle. The nut is preferably a cap nut.

According to another feature of this invention, the entrainer has two radially oppositely extending arms which engage in corresponding recesses in the valve control disk. The hub of the entrainer can have an outer diameter which corresponds substantially to the diameter of the inner support shoulder so that the recesses in the valve control disk are radially open on one side of the throughgoing opening formed as a semicircular ring segment.

The sealing element between the valve body and the housing can be formed by a support ring fitted into the housing adjacent the end of the aforementioned passage and supporting the sealing ring which is constituted of an elastomeric material. The opening of this passage at the end of the housing can be widened.

Downstream of the support ring, a further annular shoulder can be provided in the housing to brace the support ring and sealing ring when the unit is inserted into the valve body and press the sealing ring radially against the wall of the passage. The sealing ring can be vulcanized to the support ring and so dimensioned that it is held by friction in the housing and cannot fall out when the unit is inserted into the valve body. The sealing ring itself can have a pair of sealing lips which are concentric with one another and can taper in the upstream direction to define a V-section space between them.

The valve according to the invention thus comprises:
a valve body having an axial inlet and a radial outlet; and
a valve unit received in the valve body, the valve unit including:
a housing having a longitudinal axis, and formed with an axial inlet passage at one end of the housing communicating with the axial inlet of the valve body, at least one radial outlet opening communicating with the radial outlet of the body, an inwardly extending annular outer support shoulder on a wall of the housing between the passage and the outlet opening, and an annular inner shoulder radially spaced inwardly from the outer shoulder and surrounding the axis, the shoulders being located within an outline of the passage projected along the axis;
a valve seat disk received nonrotatably in the housing and seated against both of the shoulders, the valve seat disk being provided with at least one throughgoing opening,
a valve control disk rotatable in housing, upstream of the valve seat disk and lying thereagainst, the valve control disk having at least one opening alignable with the opening in the valve seat disk,
a valve spindle operatively connected to the valve control disk, extending through the valve control disk along the axis, journaled in the housing and closely surrounded by the inner shoulder, the valve spindle being rotatable about the axis to rotate the valve control disk relative to said valve seat disk, and
a spring in the housing acting upon the valve spindle and braced against the valve spindle and positioned for axially pressing the valve-control disk against the valve seat disk.

The advantages of the valve of the invention include an optimal configuration of the unit to enable it to be inserted into conventional valve bodies. The bracing of the valve seat disk is such that it cannot be distorted or deformed as was hitherto the case. Furthermore, the spring is removed from the flow path.

The unit allows a simple arrangement of seals to be adopted between the valve housing and the valve seat disk as well as between the housing and the valve body. All moveable parts other than the control disk are out of the fluid path so that deposits and corrosion of moving parts can be avoided.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
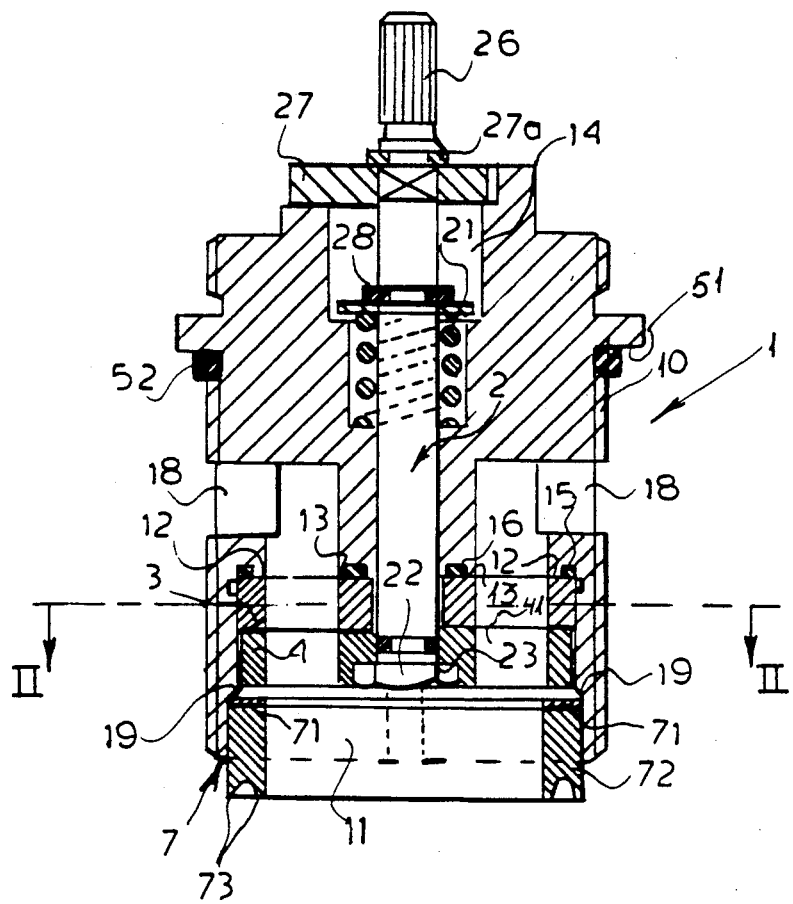
FIG. 1 is an axial section taken along the line I—I of FIG. 2 of a shut-off and control valve of the invention.

In the various figures, common reference numerals are used to identify the same or similar functioning parts.

Figure 2:
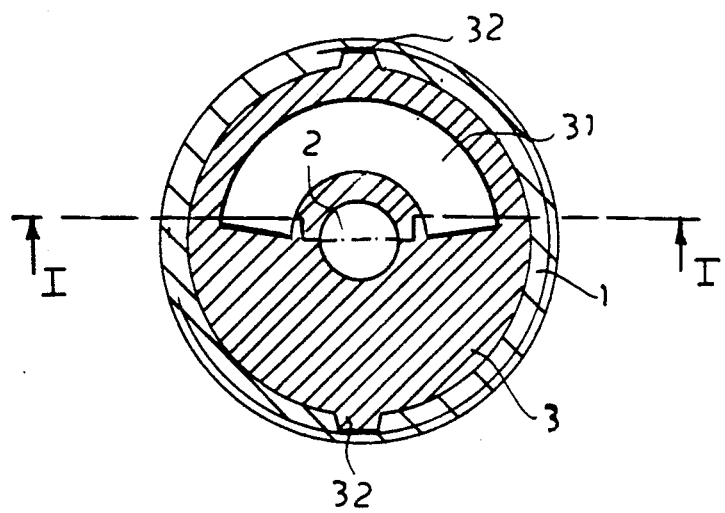
FIG. 2 is a section taken along the line II—II of FIG. 1.
Figure 3:
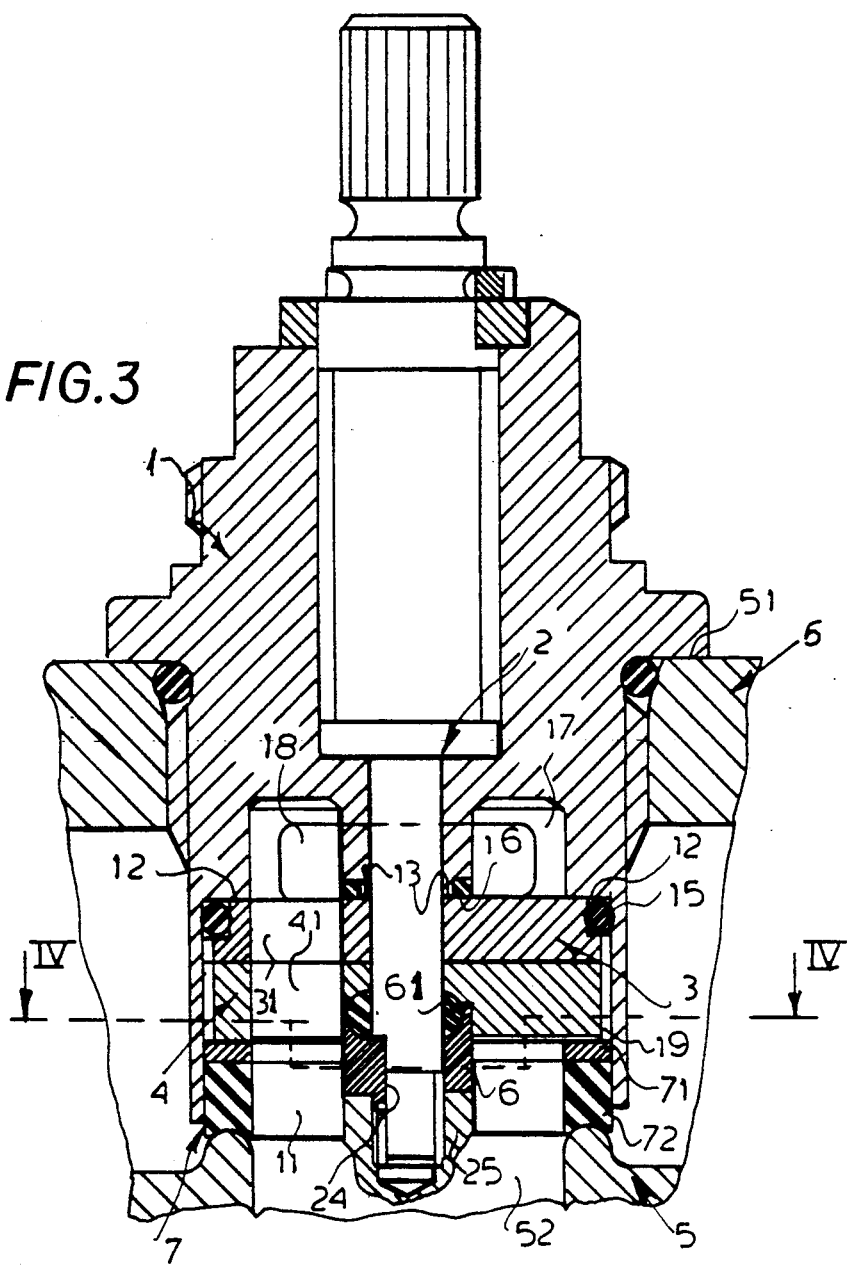
FIG. 3 is a view similar to FIG. 1 illustrating another embodiment of the invention and partly showing the valve body.

In the embodiment of FIGS. 1 and 2, the valve body has not been shown but can be identical to the valve body 5 illustrated in FIG. 3. The valve unit which has been illustrated in FIGS. 1 and 2 and is adapted to be received in the valve body, comprises a generally cylindrical housing 1 provided with a screw thread 10 enabling it to be screwed into the valve body. The housing 1 has an inlet passage 11 extending coaxial with the housing and communicating with the inlet of the valve body, e.g. the inlet 52 shown in FIG. 3. The housing 1 also has radial outlet openings 18 which can communicate with an outlet such as a spigot via the radial passages shown in FIG. 3.

As can be seen from FIGS. 1 and 2, in the passage 11 and the area between this passage and the outlet opening 18, a valve seat disk 3 is provided at a relatively downstream location and a valve control disk 4 is disposed upstream therefrom and presses against the valve seat disk.

In the projection of the inlet passage 11 along the axis of the valve, an outer support shoulder 12 projects radially inwardly and an inner support shoulder 13 is provided on the housing. These shoulders are coaxial with the housing.

Sealing rings 15 and 16 seated in the shoulders are likewise coaxial and seal the housing with respect to the valve seat disk. The valve seat disk in its relatively wide inner and outer annular regions, is thus supported and sealed and braced against deformation and distortion. Once inserted, the valve seat disk may be held against rotation by one or more teeth 32 engaging complementary teeth of the housing and enabling axial displacement of the valve seat disk 3.

Upstream from the valve seat disk and defined between the inner and outer support shoulders, is an annular chamber 17 which opens into the radial outlet openings 18 formed in a wall of the housing.

A valve spindle 2 is journaled coaxially in the housing an at its upstream end has a heated portion 22 with which the valve control disk formed is connected for joint rotation and so that the valve spindle can draw the valve control disk axially against the valve seat disk 3. Toward the downstream side of the valve spindle, a coil spring 21 in a recess 14 of the housing is protected from the liquid traversing the path between the passage and the outlet opening.

The valve spindle 2 projects out of the housing 1 with a splined pin 26 so that a handle or other actuating member can engage the spindle in the region. A stop disk 17 can be connected to the spindle and can engage in abutment of the housing to limit the angular displacement of the spindle. The valve spindle 2 is so dimensioned that it passes through a central opening of the valve seat disk 3 and engages in a receiving opening of the valve control disk 4 and has a head portion 22 which bears axially against the valve control disk and rotatably entrains the latter with the spindle.

The sealing between the valve control disk 4 and the valve spindle 2 is effected by a sealing ring 23 which can be an O-ring.

The seal of the housing 1 against the valve body, not shown in FIG. 1 but clearly seen in FIG. 3, is effected by means of a sealing assembly 7 cooperating with the inlet port of the valve body and disposed at the upstream end in an enlarged region of the inlet passage 11 of the housing 1.

This sealing element comprises a support ring 71 which rests against an annular shoulder 19 of the housing 1 when the sealing assembly is inserted with a friction fit in the inlet passage.

At the upstream side of the support ring 71, which is composed of metal, a sealing ring 72 of rubber is vulcanized. At its upstream side, the sealing ring 72 has two concentric circular sealing lips 73 which are wedge-shaped in cross section and define between them a V-section free space as is clearly visible in FIG. 1. This seal thus forms a flange seal which is urged by water pressure against the wall of the inlet opening and of the inlet passage 11.

The flange 51 which can have the configuration of a nut, braces another 0-ring 52 against the valve body 5 not shown in FIG. 1 but visible in FIG. 3.

The mounting of the valve unit of FIGS. 1 and 2 can be effected by initially inserting the valve seat disk 3 and the valve control disk 4 into the housing 1 by passing the valve spindle 2 through them and then inserting the assembly of the valve spindle and disks into the valve housing after the 2 sealing rings 15 and 16 have been inserted in respective annular grooves.

When the valve seat disk 3 comes to rest against the inner and outer support shoulder 12 and 13, the coil spring can be inserted in the recess !4 from the downstream end of the housing and can be locked in place by a spring ring 28 engaging in a groove of the spindle 2 to hold the spring with a certain amount of precompression.

Since the spring is braced against the valve spindle via the spring ring 28 and is braced against the housing 1, the spring force draws the valve control disk 4 against the valve seat disk 3 and the latter against the shoulders with the same force.

The sealing element 7 can then be inserted through the upstream end of the passage 11 until it engages the annular shoulder 19. At the opposite end, in the region the pin 26, the disk 27 can be placed and held by a spring ring 27a.

The disk 27, as noted, cooperates with abutments formed by the valve housing 1 to limit the rotary movement of the spindle 2.

Then the valve unit can be inserted in the body of a valve, especially a water flow valve. For this purpose, the housing one is screwed by thread 10 into the body of the valve until the flange 51 abuts a surface thereof. In this position, the seal 7 engages in the water inlet opening of the valve body to effect communication between this inlet and the passage 11. Sealing is effected in the inlet by a spreading of the lips 73 as is common with lip seals.

When the spindle 2 is rotated to entrain the valve control disk 4 into a position in which it is throughgoing opening 41 registration with the throughgoing opening 31 or is more or less aligned therewith, liquid can pass from the passage 11 into the chamber 17 and then through the outlet opening 18 out from the spigot or outlet side of the valve body.

In the illustrated embodiment, only one throughgoing opening 31, 41 has been shown in each of the valve disks 3 and 4. It will be understood, however, that a plurality of such openings can be provided for the 2 valve disks and the extension of one or both of these openings through 180° has the advantage that the angular displacement of the valve spindle can be 180° between a fully open position and a fully closed position The embodiment of FIGS. 3 and 4 differs from that of FIGS. 1 and 2 significantly only with respect to the configuration of the valve spindle 2 and its relationship to the valve controlled disk 4.

Instead of a coil spring 21, the spring provided between the valve spindle 2 and the valve control disk 4 is an axially compressible ring 62 of rubber. The spindle 2 is here braced axially against the housing.

The valve control disk is displaceably connected to the spindle 2 by an entrainer 6 interposed between the spindle and the control disk 4.

The entrainer 6 has a hub 62 which, with the aid of a non-circular surface 24 is mounted axially onto and entrained with the spindle so that it is axially shiftable but angularly keyed thereto.

The entrainer has two oppositely extending radial arms 62 which engage in corresponding recesses in the valve control disk 4. The ring 61 is provided coaxial with the spindle 2 between the valve control disk 4 and the entrainer 6 and the latter is secured to the threaded upstream end of the valve spindle 2 by a cap nut. The cap nut presses the axially shiftable entrainer 6 against the spring 61 and the spring against the valve control disk 4 which is thereby pressed resiliently against the valve seat disk 3.

The ring 61 thus applies a minimum pressing force of the valve control disk 4 against the valve seat disk and the valve seat disk against the shoulder 15 and 16 as described.

In the region of its end faces, the ring 6 which can be of frustoconical configuration as can be seen in FIG. 3 and is fitted into corresponding recesses of the valve control disk 4 and the entrainer 6 for secure positioning therein.

Figure 4:
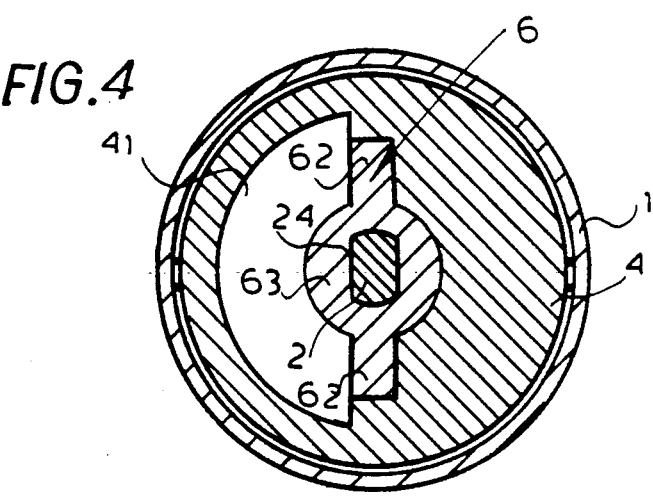
FIG. 4 is a section along the line IV—IV of FIG. 3.

The valve unit 1 of FIGS. 3 and 4 is inserted in a valve body 5 whose inlet 52 is connected to the inlet pipe 11 in the manner described in connection with FIGS. 1 and 2. Apart from the illustrated spring elements in the form of a compression spring or a rubber ring, other spring element configurations can be used.

We claim:

1. A shutoff and control valve, comprising:
   a valve unit including:
     an axially extending housing formed at one end with a first axially extending cavity and at an opposite end with an axially extending recess, said axially extending recess having inner and outer annular seats radially spaced from one another in a common plane perpendicular to an axis of said unit, and a radial outlet located between said plane and said first axially extending cavity,
     a valve spindle extending axially in said housing through said first cavity and into said recess, said spindle being provided with means in said first cavity bracing said spindle against said housing,
     an angularly fixed valve disk received in said recess and surrounding said spindle and having a first surface juxtaposed with said seats and a second surface facing away from said seats,
     a rotatable control disk received in said recess, axially abutting said second surface, surrounding said spindle and formed with a second cavity opening in a direction facing away from said angularly fixed valve disk, said disks being provided with alignable holes permitting flow of fluid to said outlet through said recess and being axially movable relative to said housing, means being provided for sealing between said control disk and said spindle,
     an element threadedly connected with an end of said spindle adjacent said control disk and formfittingly received in said second cavity for connecting said control disk to said spindle for rotation therewith and applying an axial force to said control disk toward said seats,
     a compression spring member received in one of said cavities and resiliently braced against said spindle for axially biasing said control disk against said angularly fixed disk and said angularly fixed disk toward said seats,
     inner and outer sealing rings sealingly compressed between said inner and outer seats and said angularly fixed disk, and
     an annular seal received in said recess and projecting axially therefrom; and
   a valve body having an axial inlet communicating with said recess, a radial outlet communicating with said outlet of said housing, and an annular seat engageable with said annular seal, receiving said unit whereby said housing, said spindle, said seals and said disks are insertable into and removable from said valve body as a unit.

2. The shutoff and control valve defined in claim 1 wherein said spring is disposed in said housing out of a path of liquid traversing said housing.

3. The shutoff and control valve defined in claim 1 wherein said element threadably connected with said end of said spindle is a polyhedral formation and said control disk has an opening complementarily shaped to receive said polyhedral formation, said spring being a coil compression spring surrounding said valve spindle downstream of said sealing rings and being maintained out of a flow of said liquid.

4. The shutoff and control valve defined in claim 1 wherein said end of said spindle adjacent said control disk is provided with an entrainer effecting a formfitting connection between said spindle and said control disk.

5. The shutoff and control valve defined in claim 1 wherein said spring is an axially compressible ring of an elastomeric material.

6. The shutoff and control valve defined in claim 1 wherein said spindle is provided with an entrainer angularly coupling said control disk to said spindle, said rings being disposed between said entrainer and said control disk.

7. The shutoff and control valve defined in claim 1 wherein said rings converge axially in opposite directions toward respective end faces thereof.

8. The shutoff and control valve defined in claim 1 wherein said valve spindle at said end adjacent said control disk is provided with at least one noncircular surface engaged by an entrainer axially shiftable but angularly fixed by said surface on said valve spindle, said entrainer engaging said valve spindle and being held in place by said element which is a cap nut threaded onto said spindle.

9. The shutoff and control valve defined in claim 1 wherein said valve spindle at an end adjacent said control disk is provided with an entrainer having two radially oppositely extending arms engageable in corresponding recesses formed in said control disk, said entrainer having a hub of an outer diameter corresponding substantially to a diameter of said outer annular seat so that said second cavity opening in said control disk is disposed radially to one side of said outer annular seat and has a semicircle configuration.

10. The shutoff and control valve defined in claim 1 wherein said housing is formed with a sealing element at an upstream end thereof sealingly engaging said valve body.

11. The shutoff and control valve defined in claim 1 wherein said annular seal is vulcanized to said recess and is dimensioned to fit with a friction fit in said housing preventing a falling out of said annular seal therefrom.

12. The shutoff and control valve defined in claim 1 wherein said annular seal has a pair of concentric lips formed on an upstream end thereof and defining a V-section groove between them.

* * * * *